Patented Mar. 6, 1934

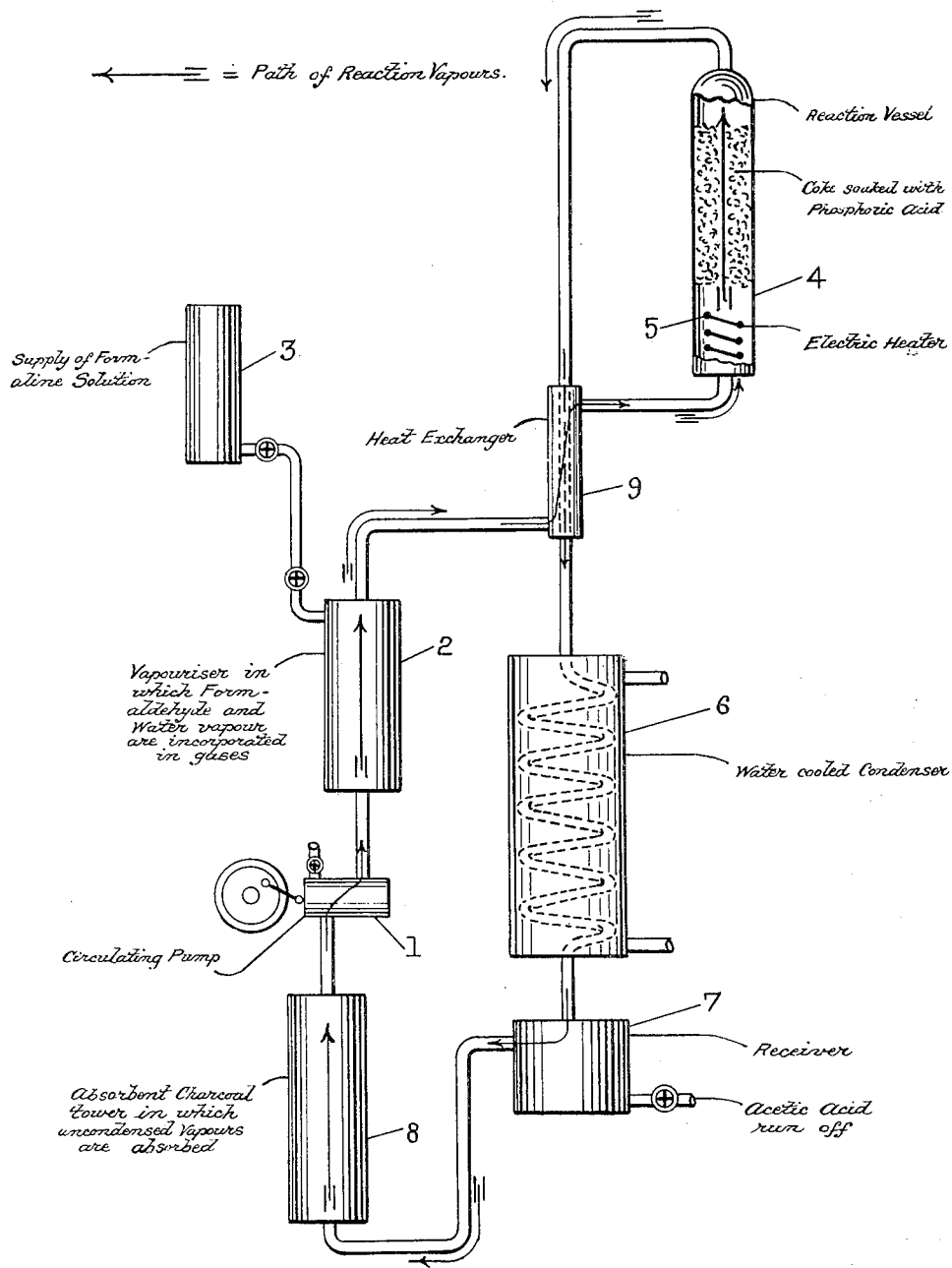

1,950,027

UNITED STATES PATENT OFFICE 1,950,027

MANUFACTURE OF ACETIC ACID

Stanley Joseph Green and Roy Handley, Spondon, near Derby, England, assignors to Celanese Corporation of America, a corporation of Delaware Application April 2, 1930, Serial No. 441,011
In Great Britain May 27, 1929

18 Claims. (Cl. 260—116)

This invention relates to the manufacture of acetic acid.

According to the invention we have now found that acetic acid can readily be prepared by subjecting the vapour of formaldehyde to the action of heat.

The formaldehyde may be submitted to the reaction in any convenient way or in any convenient form. For instance, formaldehyde vapour alone or in admixture with carbon monoxide (or gas containing the same) may be submitted to the reaction. Or, for instance, we may employ the formaldehyde in the form of condensation products with aliphatic alcohols, e. g. formal (its condensation product with methyl alcohol) and such condensation products may also, if desired, be employed in admixture with carbon monoxide (or gases containing the same).

The presence of water vapour has been found to facilitate the reaction.

We preferably perform the reaction with reaction vapours containing carbon monoxide (or gases containing carbon monoxide), and especially with reaction vapours containing carbon monoxide and water vapour.

The reaction can be performed at ordinary atmospheric pressure, but proceeds more rapidly under increased pressures, pressures of 100 to 300 or more atmospheres being advantageous. The reaction may be performed at temperatures between about 200° to 450° C. and especially between 300° and 400° C.

Catalysts which promote the synthesis of aliphatic acids from aliphatic alcohols and carbon monoxide may, if desired, be employed for catalyzing the reaction of the invention. The inorganic acid catalysts of previous U. S. patent application S. No. 138,116 filed 27th September, 1926, now Patent No. 1,864,643—i. e. inorganic acids, inorganic acids containing organic groups or acid salts of any of such acids—are especially suitable for the purposes of the present invention. Further such catalysts may, if desired, contain promoters, such for instance, as copper or copper compounds.

In performing the invention with mixtures containing carbon monoxide the carbon monoxide can be introduced either as such or in the form of industrial gases or other mixtures containing the same, as for instance water gas, producer gas or the like.

Where the reaction is performed in presence of water vapor, aqueous solutions of formaline (e. g. of from 20 to 41% strength) may conveniently be employed. For instance carbon monoxide (or a gas mixture containing the same) may conveniently be passed in a regulated stream over or through a hot or boiling solution of formaline and the resulting mixture of gas and vapour be passed under the desired pressure through the reaction chamber, which chamber preferably contains one or more of the beforementioned catalysts.

It will be understood however that water vapour may be introduced in any other convenient way either together with or separately from the formaldehyde. Further, that water vapour may be introduced in any convenient way when formaldehyde is used in the form of condensation products such as formal.

The products of the reaction may be treated in any suitable manner to recover the acetic acid contained therein, as for instance by fractionation subsequent to their condensation.

According to one method of performing the invention we use a closed train of apparatus comprising a gas circulating pump which drives carbon monoxide (or a gas mixture containing the same) first through a heated mixing chamber or vessel where formaldehyde—e. g. in the form of formal or of an aqueous solution of formaline (e. g. of 20 to 41% strength)—is incorporated with the gas in the form of vapour. The resulting gaseous mixture then passes through a heat exchanger into the reaction chamber which is preferably filled or provided with one or more of the catalysts hereinbefore referred to. The products leaving the reaction chamber pass through a heat exchanger to a condenser provided with a receiver, in which the uncondensable gases are separated from the liquid products. The liquid products are withdrawn and the gases returned to the gas circulating pump. This circuit may be supplemented by pressure gauges, temperature indicators, traps for acid preheaters, flow meters and so on.

In performing the invention in presence of a catalyst or catalysts any suitable device may be employed to bring the reaction vapours well in contact with the catalyst or catalysts. For instance in the case of a liquid catalyst the reaction gas may be bubbled through the liquid or the reaction chamber may be arranged as a washing column or it may be provided with agitators or it may be rotary and if desired provided with a carrier material for the liquid. If the catalyst is solid, or a liquid spread on a solid carrier, it is advantageously used in granular form. We prefer to use a large mass of a liquid catalyst such for instance as phosphoric acid.

The different parts of the apparatus are preferably protected against corrosion from the reaction gases. Thus for instance, when carbon monoxide is present in the reaction gases, it is preferable to avoid exposure of the gases to metals, such as iron, which are liable to form carbonyls. The parts of the apparatus in contact with acids are preferably protected against corrosion by the acid or acids present. For instance the parts in contact with acetic acid may be made of or lined with copper; whilst parts in contact with acid catalysts such as phosphoric acid may with advantage be made of or lined with gold or graphite.

The following example illustrates one form of execution of the invention, but as will be understood the invention is not limited in any way thereto.

*Example*

An approximately 41% solution of formaline is placed in a vapourizer and heated to a temperature of 100–110° C. while a current of carbon monoxide or of a mixture of carbon monoxide and hydrogen (e. g. a mixture having a composition 80% CO and 20% $H_2$) is circulated over it under high pressure (e. g. about 100 atmospheres or more). The circulating high pressure gas in this way picks up a uniform small percentage of formaldehyde gas and water vapour, which is then carried forward to the reaction vessel. The reaction vessel is lined with graphite or gold and contains glacial phosphoric acid heated to about 305–310° C. The reaction products after leaving the reaction vessel, are condensed by a water cooled copper coil, and the last traces of formaldehyde and other vapourous reaction products are removed by passage through absorbent charcoal whereafter the uncondensed gases are returned for recirculation over the formaline solution and through the system.

The condensed reaction product may be subjected to fractional distillation in order to obtain the acetic acid in as pure a form as possible.

The accompanying diagrammatic drawing serves to illustrate such method of execution of the invention.

Referring to the drawing, 1 is a circulating pump which passes the gases around the system under the desired pressure. 2 is the vaporizer heated by steam or the like to a temperature between 100–110° C. and supplied with the formaline solution from the supply vessel 3. 4 is the reaction vessel provided with the catalyst (coke soaked in phosphoric acid) and provided with an electric heater 5, which heater enables the gases to attain and be kept at the requisite reaction temperature. 6 is a water cooled condenser wherein the acetic acid formed in the process together with unconverted formaldehyde and water is separated from the reaction gases, this condenser being provided with a receiver 7. 8 is a charcoal tower for removal from the reaction gases of vapourous products escaping condensation in the condenser 6.

Assuming the apparatus to be in operation. The carbon monoxide or mixture of carbon monoxide and hydrogen passes from the pump 1 under the desired pressure (e. g. 100 atmospheres) to the vaporizer 2 wherein the gases become charged with a uniform small percentage of formaldehyde vapour and water vapour. The resulting vaporous mixture passes thence via the heat exchanger 9 to the reaction vessel 4. In its passage through the heat exchanger 9 the vaporous mixture is preheated by heat exchange by the hot reaction gases leaving the reaction vessel 4. On entering the reaction vessel 4 the vaporous mixture is raised to the requisite temperature (e. g. 250–300° C.) by the electric heater 5. The heated vaporous mixture passes through the catalyst, which catalyst is composed of coke soaked in phosphoric acid and which is maintained at a temperature between 305–310° C. by any convenient means. The reaction gases pass from the reaction vessel 4 via the heat exchanger 9 to the water cooled condenser 6 wherein the acetic acid together with unconverted formaldehyde and water are condensed, the condensate falling into the receiver 7. The uncondensed gases pass from the condenser 6 and receiver 7 to the charcoal tower 8, wherein the last traces of vaporous products are removed from the gases. From the tower 8 the gases pass to the pump 1 for recirculation through the system.

What we claim and desire to secure by Letters Patent is:—

1. Process for the manufacture of acetic acid from formaldehyde, which comprises subjecting formaldehyde vapor to the action of heat under a pressure of at least 100 atmospheres.

2. Process for the manufacture of acetic acid from formaldehyde which comprises subjecting formaldehyde vapor to a temperature between 200° and 450° C. under a pressure or at least 100 atmospheres.

3. Process for the manufacture of acetic acid from formaldehyde which comprises subjecting formadehyde vapor to the action of heat in presence of a catalyst known to promote the synthesis of aliphatic acids from aliphatic alcohols and carbon monoxide.

4. Process for the manufacture of acetic acid from formaldehyde which comprises subjecting formaldehyde vapor to the action of heat in presence of an inorganic acid catalyst capable of promoting the synthesis of aliphatic acids from aliphatic alcohols and carbon monoxide.

5. Process for the manufacture of acetic acid from formaldehyde which comprises subjecting formaldehyde vapor to the action of heat in presence of a non-volatile inorganic acid.

6. Process for the manufacture of acetic acid from formaldehyde which comprises subjecting formaldehyde vapor to the action of heat in presence of a catalyst mass comprising phosphoric acid.

7. Process for the manufacture of acetic acid from formaldehyde which comprises subjecting formaldehyde vapor to the action of a temperature between 200° and 450° C. under a pressure of at least 100 atmospheres in presence of phosphoric acid containing a copper promoter.

8. Process for the manufacture of acetic acid from formaldehyde, which comprises subjecting formaldehyde vapor in the presence of carbon monoxide to the action of heat under a pressure of at least 100 atmospheres.

9. Process for the manufacture of acetic acid from formaldehyde, which comprises subjecting a mixture of formaldehyde, carbon monoxide and water vapor to the action of heat under a pressure of at least 100 atmospheres.

10. Process for the manufacture of acetic acid from formaldehyde which comprises subjecting formaldehyde vapor in presence of carbon monoxide to a temperature between 200° and 450° C. under a pressure of at least 100 atmospheres.

11. Process for the manufacture of acetic acid from formaldehyde which comprises subjecting a mixture of formaldehyde, carbon monoxide and water vapor to a temperature between 200° and 450° C. under a pressure of at least 100 atmospheres.

12. Process for the manufacture of acetic acid from formaldehyde which comprises subjecting a mixture of formaldehyde, carbon monoxide and water vapor to a temperature between 200° and 450° C. under a pressure of at least 100 atmospheres in presence of a catalyst known to promote the synthesis of aliphatic acids from aliphatic alcohols and carbon monoxide.

13. Process for the manufacture of acetic acid from formaldehyde which comprises subjecting a mixture of formaldehyde, carbon monoxide and water vapor to a temperature between 200° and 450° C. under a pressure of at least 100 atmospheres in presence of a catalyst mass comprising phosphoric acid.

14. Process for the manufacture of acetic acid from formaldehyde which comprises subjecting a mixture of formaldehyde, carbon monoxide and water vapor to a temperature between 200° and 450° C. under a pressure of at least 100 atmospheres in presence of phosphoric acid containing a copper promoter.

15. Process for the manufacture of acetic acid from formaldehyde which comprises subjecting a mixture of formaldehyde, carbon monoxide and water vapor to a temperature between 300° and 400° C. under a pressure between 100 and 300 atmospheres in presence of a catalyst mass comprising phosphoric acid.

16. Process for the manufacture of acetic acid from formaldehyde which comprises passing a stream of carbon monoxide under pressure through a heated aqueous solution of formaline and passing the resulting mixture of carbon monoxide, formaldehyde vapor and steam under a pressure of at least 100 atmospheres through a reaction vessel heated to a temperature between 300° and 400° C. and containing a catalyst mass comprising phosphoric acid.

17. Process according to claim 16 and wherein the stream of carbon monoxide is passed under a pressure of at least 100 atmospheres through an aqueous solution of formaline of between 20 and 41% strength heated to a temperature between 100° and 110° C. and wherein the resulting mixture of carbon monoxide, formaldehyde vapor and steam is passed under a pressure of 100 atmospheres through a reaction vessel heated to a temperature between 305° and 310° C. and containing glacial phosphoric acid.

18. In a process according to claim 16 the steps of passing the reaction mixture issuing from the reaction zone successively through (a) a water cooled condenser to separate liquefiable reaction products, (b) a mass of active charcoal, and thereafter recirculating the reaction gases through the heated formaline and through the heated reaction zone.

STANLEY JOSEPH GREEN.
ROY HANDLEY.